United States Patent Office 3,503,742
Patented Mar. 31, 1970

3,503,742
DESENSITIZATION OF PHOTOSENSITIVE MATERIALS BY SUBJECTING THE NON-IMAGE AREAS TO AMMONIA
Yoshikazu Yamada, Sierra Madre, and Thomas H. Garland, El Monte, Calif., assignors to Bell & Howell Company, Chicago, Ill., a corporation of Illinois
No Drawing. Continuation-in-part of applications Ser. No. 278,050 and Ser. No. 278,419, both May 6, 1963, and Ser. No. 481,759, Aug. 23, 1965. This application Nov. 17, 1965, Ser. No. 508,390
Int. Cl. G03c 5/24
U.S. Cl. 96—48                                         11 Claims

ABSTRACT OF THE DISCLOSURE

A process for stabilizing a photographic image formed by image-wise exposure to actinic light of a photosensitive combination of an organic halogen compound and a nitrogen atom-containing compound, whereby areas of the image not light-struck by the exposure are subjected to ammonia.

---

This application is a continuation-in-part of our applications Ser. No. 278,419, filed May 6, 1963, Ser. No. 278,050, filed May 6, 1963, and Ser. No. 481,759, filed Aug. 23, 1965, each of the applications being entitled "Production and Use of Photosensitive Compositions and Films."

The instant invention relates generally to the photographic art, and more particularly, to improved methods of producing photographic or photosensitive compositions, films or articles, and to improved photographic methods relating thereto, and the instant invention further relates to the photographic or photosensitive compositions, films or articles obtained.

The instant invention relates to compositions which are sensitive to light and which are suitable for photography and photographic reproduction purposes. The instant invention also relates to the preparation of such compositions, and photographic films or similar articles from such compositions, and the use of such photographic films in subsequent photographic reproduction procedures.

In general, it is old and well known in the photographic arts to provide photographic systems involving two or more materials which react under the influence of actinic light to produce a color. As early as 1921, Murray C. Beebe and his coworkers described numerous photographic systems (e.g., U.S. Patents Nos. 1,574,357; 1,574,358; 1,574,359; 1,575,143; 1,583,519; 1,587,269; 1,587,270; 1,587,271; 1,587,272; 1,587,273; 1,587,274; 1,604,674; 1,618,505; 1,655,127; 1,658,510; and 1,820,-593). As a general rule these various allegedly photographic systems proposed by Beebe relate to the use of various halogen compounds (e.g. iodoform and others) in combination with a second ingredient, in which Beebe and subsequent workers have theorized that the light effects the release of a radical from the halogen compound which carries out a color-forming reaction with the second compound. Subsequent workers such as Engene Wainer (e.g. U.S. Patents Nos. 3,042,515; 3,042,516; 3,042,517; 3,042,518; 3,042,519; 3,046,125; and 3,056,-673) and Robert Sprague (U.S. Patent No. 3,082,086), as well as a number of other workers since the time of Beebe, have continued the development of various allegedly photographic systems involving a photo-energized reaction of a combination of a halogen-containing compound and one or more other compounds. Other recent disclosures include U.S. Patent No. 3,201,240, British Patent No. 917,919 and Belgian Patent No. 596,094.

Although the instant invention is not limited to the use of the aforesaid combinations or systems, or the theories and/or principles described in such patents, it will be apparent from the following description of the instant invention that many of the various materials described in these patents may be used in the practice of the instant invention. In fact, the instant invention contemplates the use of two or more ingredients, each of which per se may have been known in the prior art and which may have been understood by prior workers in the art to be capable of coreaction in response to actinic light to produce colors. The instant invention, however, involves certain methods of controlling the photosensitivity of such systems, particularly insofar as such methods are applied to new and unique physical and/or chemical aspects of the combinations of ingredients here employed.

It is, therefore, an important object of the instant invention to provide improved photographic methods and compositions or films or the like article involved in the use of such methods. It is a further object of this invention to provide a method of stabilizing exposed photographic compositions which utilize the organic photosensitive combinations described above. It is a still further object to stabilize compositions which comprise a dispersion of an organic halogen compound and a second ingredient. It is a particular object to provide a method for stabilizing such photographic compositions wherein a combination of organic halogen and nitrogen-containing compounds are dispersed in a non-solubilizing continuous phase. It is another particular object to provide a method wherein a negative-working photographic image is effectively stabilized against fogging and can be used repeatedly as a master in diazo and other reproduction processes involving repetitious exposure to light of any wavelength.

Other and further objects, features and advantages of the present invention will become apparent to the skilled worker in the art from the following detailed description thereof.

In general, the instant invention comprises a process of desensitizing a photographic image, preferably in a translucent carrier, formed by imagewise exposure to actinic light of (a) a color-forming ingredient and (b) an organic halogen compound which reacts with (a) to form a color in response to such exposure to actinic light, as starting agents, which desensitization is carried out by subjecting the residual photosensitive portions of such combination in said carrier to ammonia, preferably at a temperature within the range of about 20° C. (or approximately room temperature) to about 200° C. Such ammonia treatment is carried out only for a short time sufficient to form with the combination a substantially new and distinct photoinsensitive combination.

Thus, our invention deals with a process of desensitizing a photosensitive combination in which a photographic image has been formed by imagewise exposure of said combination to actinic light, said combination comprising at least two starting agents, one of which is an organic halogen compound. The desensitization is accomplished by subjecting areas of said image, not light-struck by said exposure, to ammonia, the ammonia being in the form of a gas or in solution, e.g. in the form of ammonium hydroxide.

An important aspect of the instant invention resides in the ability of the original combination (ab) to form a suitable image having color or selective light absorptivity which image is not subsequently destroyed to the extent that it is no longer useful by the ammonia treatment. In other words, the ammonia treatment is intended only to desensitize areas in which the color-forming reaction of the combination (ab) has not taken place, i.e., areas which were not initially light-struck in the image-wise exposure to actinic light in accordance with the negative-working system of the instant invention.

It will be appreciated that in a negative-working system, the photosensitive film is subjected to actinic light in an image-wise projection (or exposure) initially wherein the light areas of the object or the original image are employed to project light to corresponding areas which are "light-struck" on the photosensitive film, and these light-struck areas on such photosensitive film ultimately appear as the darker colored areas either as a result of direct print-out by the projected actinic light as a result of subsequent heating and/or other treatment to develop the darker colored areas. In the same system, the dark areas of the original object or image are made to appear as light areas in the resulting photosensitive film or layer employed in the negative-working process. These latter areas are not "light-struck" by initially projected actinic light during the image-wise initial exposure, and these areas thus retain their photosensitivity (as in the case of non-light-struck silver halide areas in silver photography). The instant invention provides a method of desensitizing these areas so that they will not later develop and/or otherwise impair the desired image on the film during subsequent uses.

In a preferred embodiment of this invention, the photosensitive combination comprises at least two starting agents, (a) and (b), one of which, (b), is an organic halogen compound. In other preferred embodiments, the other starting agents, (a), is a nitrogen atom-containing compound having certain structural characteristics. Thus, our process is particularly suitable when the nitrogen atom-containing compound used in the photosensitive combination has a nitrogen atom attached directly to at least one benzene ring, said benzene ring being free from carbon atom substitution in the position para to said nitrogen atom attachment.

Our process is also particularly suitable with nitrogen atom-containing compounds in which the nitrogen atom is a member of a heterocyclic ring. Still another type of nitrogen atom-containing compound with which our process is particularly useful is an N-vinyl compound.

It will be appreciated that there is substantial overlap between the above types of compounds and that our process is useful with photosensitive combinations that are formulated with nitrogen atom-containing compounds falling within one, two or even all three of the above terms; e.g., N-vinylcarbazole. It will also be appreciated that there is no generic term available in accepted chemical terminology that will effectively embrace all of the above types of nitrogen atom-containing compounds. It is merely important to note that photosensitive combinations containing a compound which has at least one of the above characteristics can be readily desensitized by the process of this invention. Photosensitive combinations containing compounds having more than one of the above characteristics lend themselves even better to our process. Examples of particularly effective nitrogen atom-containing compounds include N-vinylcarbazole, N-ethylcarbazole, indole and diphenylamine.

Our process is particularly suitable to desensitizing photosensitive combinations in which the organic halogen compound is selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto.

In another particular embodiment of this invention, the combinations which are desensitized by our process contain an organic halogen compound having the formula Br—C—(X) (X') (X")$_n$(CY$_3$)$_{1-n}$ wherein X, X' and X" are halogens, each Y is independently selected from the group consisting of halogen, hydrogen, hydroxy, methyl and methylol and $n$ is selected from 0 and 1, such that when $n$ is 0, X and X' are Br.

Examples of suitable organic halogen compounds include bromotrichloromethane, bromoform, iodoform, 2,2,2-tribromoethanol, 1,1,1-tribromo-2-methyl-2-propanol and, having particular effectiveness, carbon tetrabromide, tribromochloromethane, dibromodichloromethane, tribromoacetic acid, pentabromoethane, hexachloroethane, and hexabromoethane.

In still another, particularly preferred embodiment of this invention, the combinations desensitized by our process comprise (1) a photosensitive dispersed phase in the form of discrete globules of a combination of compounds (a) and (b) in a (2) continuous phase in which said dispersed phase is substantially insoluble. During preparation of the combinations, the continuous phase, i.e., the dispersing medium, is preferably aqueous. Examples of such dispersing mediums include gelatin, casein, polyvinyl alcohol, gum arabic, starch, alkali metal carboxymethylcellulose (e.g., sodium carboxymethylcellulose) and hydroxyethylcellulose.

Further descriptions and examples of nitrogen atom-containing compounds, organic halogen compounds, dispersing mediums and other facets of compositions that can be desensitized by our process are given in our applications Ser. Nos. 278,050 and 481,759, noted above.

When an N-vinyl compound is used in a non-solubilizing continuous phase, as in our noted applications, a complication arises which is solved by the present invention. In the environment of such a continuous phase the combination of organic halogen and N-vinyl compound is capable of undergoing two separate and distinct reactions on exposure to actinic light. In one reaction, in a negative-working mode, a colored dye is formed in light-struck areas, as noted above. In another reaction, in a positive-working mode, "colorless" polymer is thought to be first formed and subsequent blanket exposure to "stronger" light, forming a colored dye in the initially non-light-struck areas, yields a positive-working image. These two reactions are competitive, the kinetics of which say that one or the other will predominate depending on the wavelength-intensity-exposure of light, with the "colorless" polymer-forming reaction occurring with "weaker" light. The result is that in the negative-working mode in fringe areas of exposure, especially where the exposure is by projection or in contact exposure where the contact is not exact and uniform, some polymeric reaction takes place; not enough reaction to form a line of demarcation between the image and non-image areas, but enough to form a protective polymeric coating around globules of material that are still photosensitive and capable of forming dye. This same effect is also found when reproducing tonal images; those areas of the image which receive only a slight exposure to light tend to form polymeric coatings around globules of still photosensitive materials. Even in those areas which are not exposed to imaging light, if a heat-treatment is used to bring out the image, some polymer may form as a result of previous slight light exposure during preparation of the coating and handling of the coated paper. Thus, if extreme measures are not taken to exclude all traces of actinic light during preparation of the coated paper, exposure to such traces of light may be sufficient, on subsequent heat-treatment, to form a polymeric coating around still photosensitive material. These fringe, tonal and partially "exposed" areas are particularly difficult to desensitize as the polymeric coating is impenetrable by most desensitizing materials. Our invention provides desensitizing means which effectively stabilizes the film against further color development, even on long exposure to ultraviolet light.

A particularly important use involved in the practice of the instant invention is in the diazo reproduction system. In such system, a so-called diazo master or intermediate is prepared, by the in stant negative-working system, and this diazo intermediate is employed in conjunction with actinic near (i.e., about 3500–4300 A.) ultraviolet light to produce a substantial plurality of diazo prints (in succession). In this use the diazo intermediate is subjected to repeated exposures of actinic near ultraviolet light, and the instant invention provides a method for desensitizing certain areas of the instant diazo intermediate such that they will not develop during such repeated exposures to actinic near ultraviolet light in the diazo "printing" process.

EXAMPLE 1

A charge of (a), 5 grams of N-vinylcarbazole (melting point 65–67° C.), as a starting agent, and (c) 10 grams of starch in 90 milliliters of water, as a continuous phase is violently agitated at high speed in a Waring blendor, with heating up to a temperature of 70–72° C. primarily as a result of the dispersing effect of the blender over a period of 10–15 minutes, with such high speed agitation being continued at such temperature for a time (e.g., 2–3 minutes in this run) sufficient to obtain a substantially uniform "agent-in-water" emulsion (which time is preferably held to the minimum permitted to obtain a uniform emulsion). Once the dispersed agent is liquefied, its fundamental characteristics such as particle size, etc., may be controlled within limits by selection of time-temperature-agitation conditions.

At this stage, the substantially uniform emulsion is understood to comprise (c) an aqueous-starch substantially translucent-solid-film-forming vehicle, functioning as the continuous phase, containing intimately dispersed therein a dispersed phase consisting essentially of (a) N-vinylcarbazole in monomeric molten or liquefied form reduced by the viscosity differences between the phases and the violent agitation to substantially fine-sized, discrete, rounded, generally spheroidal (if not actually spherical) globules (i.e., liquefied dispersed particles) which are substantially insoluble in the continuous phase (c).

Next, a charge of (b) 0.5 gram of hexachloroethane (sublimes at 187° C.), as a second starting agent, is added to the blender with continued high speed agitation at the temperature of 70–72° C. until a substantially uniform emulsion is again obtained, which takes only 1–2 minutes (which time is preferably held to the minimum permitted to obtain a uniform emulsion).

At this stage, the emulsion is understood to comprise substantially the same continuous phase (c) with a different dispersed phase wherein the molten N-vinylcarbazole (a) has fused with the hexachloroethane (b), which starting agents (a) and (b) are believed to be miscible under these conditions, to form a new combination (ab) that is in molten or liquefied form reduced by viscosity differences between the phases and the violent agitation to substantially fine-sized, discrete, rounded, generally spheroidal globules, which are substantially insoluble in the continuous phase (c).

As soon as the substantially uniform emulsion of the previous paragraph is obtained, agitation is discontinued and then the emulsion is applied to a sheet of translucent (vellum- paper in a wet film thickness of 3 mil (using the Bird coating bar drawdown technique). The dispersed phase combination (ab) solidifies quickly in situ in the film-forming vehicle (c) as the emulsion is cooled, to form substantially uniformly sized, discrete, substantially non-agglomerated, generally spheroidal solidified particles having an average particle size of diameter of about 3–4 microns (within an approximate range of about 0.3 to about 10 microns). The paper sheet with the wet film coating thereon is placed in a dark room dryer at room temperature for about ½ hour, to obtain formation of a dry solid continuous phase (c), i.e., that is dry to the touch, whereby a substantially translucent continuous phase film is obtained having a uniform (colorless appearance). This film is photosensitive and (with certain exceptions hereinafter noted) it should be kept until ready for use in the substantial absence of strong ultraviolet actinic light and the preparation thereof including the production of the emulsion itself hereinbefore described is, of course, carried out in the substantial absence of such actinic light. An advantage of the invention is that precautions ordinarily taken in silver photography are not here necessary.

The starting agents (a) and (b) are each separate and distinct light absorbers; each is substantially colorless as such when dispersed or dissolved in a transparent inert carrier (and each is substantially insoluble in the continuous phase (c), in liquid or solid form). The co-fusion, co-liquefication and/or solution (and/or mutual plasticization) which takes place in situ in the continuous phase (c) between the starting agents (a) and (b) results in a very intimate, substantially homogenous combination (ab) during such violent agitation and heating, and, during the overall time-temperature cycle here used, such dispersed phase combination (ab) ultimately solidifies in situ in the continuous phase (c), in a system characteristic of an intrinsic colloid, evidenced in part by non-agglomeration of such solidified (or solidifying) particles, which highly desirable property is believed to be enhanced by such solidification in situ.

The dispersed or solidified combination (ab) is understood to possess within the individual particles substantial homogeneity characteristic of the solid solution state, and although the existence of the academically true solid solution is very difficult to evaluate as a practical matter these particles possess homogeneity such that they are here characterized as being solid solutions. The combination (ab) has separate and distinct light absorption characteristics, which in this particular case differ only slightly from the substantially colorless starting agent (a). The change from substantially colorless starting agents (a) and (b) to the combination (ab) may be a chemical combination of at least a complex, if not a truly new chemical compound. Moreover, it will be seen that this combination (ab) is not merely premature photo-development or photo-chemical reaction, since this photosensitive dispersed phase combination (ab) is capable in response to sequential exposure to actinic light and heat of conversion to a distinctly colored product (having a tan color), which has light absorptivity separate and distinct from that of the individual starting agents (a) and (b), as well as the combination (ab) thereof initially obtained in the film.

The change in light absorptivity obtained in the photosensitive combination (ab) from that of either starting agents (a) or (b) does not, however, necessarily involve complete chemical change and/or complete loss of chemical identity of the starting agents (a) and (b) at this stage. In fact, the indication is that each particle of the combination has the characteristics of a solid solution of (a), (b) and the interaction product (ab) thereof, because of the apparent molecular intimacy of the association of the components evidenced by their ready reactivity and high photosensitivity.

In this respect, it will be understood that the term "light absorptivity" or the term "light absorber" of actinic light) is understood to involve a substantial or significant quantitative and qualitative absorption of actinic light (within the available range of wavelengths). Even if this combination (ab) were purely physical, e.g., a solid solution only, the different characteristic light absorptivity thereof can be (and in many such combinations of the invention probably is) the result merely of the creation of a physical system within the particle wherein a given particular light absorption characteristic (in quantity and/or quality) will dominate.

Negative-working system of
Example 1

The foregoing sheet of transparent (or translucent) paper with the dried emulsion film applied thereto (as described in Example 1) is then initially exposed for 15 seconds to a 15-diameter image formed by a blowup from a microfilm negative in a microfilm projector using a 500 watt mercury arc lamp as a light source (which includes light of wavelength in the range 3500–3700 A.). Next, the exposed sheet is heated to 350° F. to develop a "positive" image (which would now correspond to the positive from which the negative microfilm was made).

After the image has been brought out by heating at 350° F. for a period of about 15 seconds, the resulting developed film, which is functional as a developed diazo intermediate, is photographically desensitized by exposure to ammonia vapor, e.g., by passing such developed diazo intermediate through the ammonia unit of a conventional diazo printer. (It is estimated that this conventional procedure involves exposing the film to approximately 10 to 1,000 times its volume of ammonia vapor over a period of about 30 seconds and at a film temperature of about 100°–200° F.) The resulting developed diazo intermediate is found to be desensitized in a particularly effective manner, having an effectively stable image thereon that is substantially opaque to the radiation used in exposing diazo sheets (i.e., substantially 3500–4300 A.). It is found that the instant desensitized diazo intermediate may be used in the printing of conventional diazo prints, using conventional procedures, so as to make as many as 40 or 50 copies without any apparently significant or conspicuous "fogging" of the intermediate. In the absence of such desensitizing procedure, however, the "fogging" develops after several copies.

EXAMPLE 2

A procedure is carried out that is the same as that of Example 1, except that the agent (b) used is 0.5 gram of pentabromoethane, and after the initial image-wise exposure to the microfilm negative using the mercury arc lamp as a light source, the resulting diazo intermediate is developed by heating to substantially 225° F. for about 15 seconds. Desensitizing with ammonia is carried out in the manner described in Example 1, and the resulting developed diazo intermediate is found to be effectively protected against "fogging" and capable of printing 40 to 50 diazo prints without apparent "fogging."

The image obtained in the resulting diazo intermediate is, however, more of a yellowish-brown color than that obtained in Example 1.

EXAMPLE 3

A procedure is carried out that is the same as that of Example 1, except that the agent (b) used is 0.25 gram of carbon tetrabromide (and the resulting combination (ab) before it is exposed has a slight yellow cast), and the image-wise exposure with the mercury arc lamp is carried out for only 5 seconds, and the resulting diazo intermediate is developed by heating to substantially 225° F. for only 2–3 seconds and a greenish-black image develops. If the heating at 225° F. is continued for 15 seconds, the image develops a yellow-brown color; and this latter developed diazo intermediate is then desensitized with ammonia in the manner described in Example 1.

On the other hand, the sheet with a greenish-black image (i.e., heated for only 2–3 seconds at 225° F.) is converted to a diazo intermediate by the same ammonia desensitizing process hereinbefore described, except that image changes in color during the process (to the yellow-brown image of the previous paragraph).

EXAMPLE 4

A procedure is carried out that is the same as that of Example 1 except that the agent (b) used is a combination of 0.5 gram of hexachloroethane and 0.1 gram of carbon tetrabromide (and the resulting combination (ab) before it is exposed has a slight yellow cast), the image-wise exposure with the mercury arc lamp is carried out for only 2 seconds, and the resulting diazo intermediate is developed by heating to substantially 350° F. for only ½ second and a greenish-black image develops. If the heating at 350° F. is continued for 5 seconds, the image develops a brown color (more typical of that obtained in Example 1); and this latter developed diazo intermediate is then desensitized with ammonia in the manner described in Example 1.

The sheet with the greenish-black image (i.e., heated for only ½ second at 350° F.) is, of course, converted to a diazo intermediate by the same ammonia desensitizing process described in Example 3, with a corresponding color change during the process to the brown image described in the previous paragraph.

EXAMPLE 5

A procedure is carried out that is the same as that of Example 4, except that the initial development by heating is carried out by heating only to 195° F. for about 15 seconds, and a greenish-black image develops (comparable to the greenish-black image described in Example 4). This greenish-black image is, likewise, converted to the previously described brown image by processing in the ammonia chamber while it is simultaneously desensitized in accordance with the previous procedure.

It will be appreciated that the solid-film-forming component used in the practice of the instant invention in the previously described continuous phase (c) may be any of a number of generally photographically inert materials, which are characteristic of essential film-forming components of the continuous phase used herein and which are in most cases soluble or so finely dispersible in the concentrations of use that for practical purposes there is no distinction between solution and dispersion for these materials in the continuous phase (c). Such materials include the preferred starch (and starch derivatives), but also include proteins (i.e., casein, zein, gelatin, thiolated gelatin, etc.), alginates, gums, and the like materials which are generally considered to be natural derivatives of natural film-forming materials, any one of which in its conventional "water-soluble" form is used in the practice of the instant invention. In addition, synthetic water-soluble film-formers may also be used to particular advantage in the practice of the invention, using an aqueous continuous phase (c), and such materials include polyvinyl alcohol, commercially available water-soluble polyacrylics or acrylates (i.e., water-soluble polyacrylic acid salts having substantially the molecular weight and water compatibility of the polyvinyl alcohol), various commercially available amine or amide-aldehyde resins, etc. Also, a number of cellulose derivative film-formers may be used, and these include the various water-soluble cellulose ethers, carboxymethylcellulose, hydroxypropylmethylcellulose, etc. Essentially these materials are photo-insensitive and their principal function is that of forming the desired film which will retain the dispersed phase in discrete non-agglomerated particle form in the manner desired in the practice of the instant invention.

In general, in the practice of the instant invention, the selection of the agent (a), namely, an aromatic N-containing compound merely for its ability to form some sort of color with a halogen-containing compound (b) under the influence of actinic light is a practical minimum for purposes of demonstrating the invention. In the preferred embodiment of the invention the starting materials selected are solids, mutually fusible at a temperature which does not result in complete desensitization of the composition, and most preferably mutually fusible or combinable in the manner hereinbefore described to obtain a normally solid photosensitive combination. On this basis, the invention may be demonstrated with respect to the ability to control many of the essential aspects of practical photographic compositions, films and products in the manner hereinbefore described. Further, it has been found that the aromatic N-containing compound structure which is particularly useful in the practice of the instant invention has the following general formula (I) hereinafter set forth, wherein the dotted line indicates an incompletely shown heterocyclic ring structure, and the C=C indicates the vinyl group. In general, it is believed that the structure (I) is capable of color formation with a halogen-containing compound, wherein the halogen is bonded directly to a carbon atom (and preferably a plurality of halogens are bonded directly to a single carbon atom), so long as the instant compound (I) has not first undergone some other reaction. Preferably the halogen containing compound has the fundamental structure of a $C_1$–$C_4$ alkane (the best results being obtained with the methane and ethane fundamental structure) and preferably it has the minimum of at least three halo substituents selected from the class consisting of Cl, Br and I with a minimum of at least three such halo substituents attached to a terminal C in such alkane molecule.

Prior art workers have indicated that organic halogen compounds react under the influence of light with aryl amines to produce color, preferably when the aryl group is attached directly (via a nuclear C atom) to the amine N atom, as in the case of diphenylamine. Preferably, however, in the practice of the instant invention, the N-containing compound is an aromatic compound but it is one which has a heterocyclic N atom in a ring conjugated with one or more benzene rings (and in this particular structure it is preferable to have the heterocyclic N atom attached to a C atom in a benzene nucleus, and it is additionally preferable to have this C atom included within the heterocyclic ring structure as well as being directly attached to the benzene ring structure). The heterocyclic N atom is also preferably attached to a C atom of a vinyl group. Accordingly, it is believed that the N-vinyl indoles and carbazoles are of particular interest in the practice of the instant invention. Other N-vinyl aromatic ring structures adapted for use in the practice of the instant invention include the following various structures:

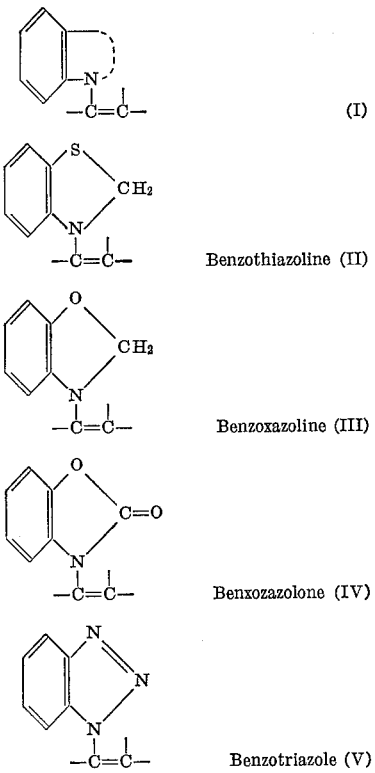

With respect to the selection of the halogen-containing compound preferred for use in the practice of the instant invention it is appreciated that elaborate definitions of the halogen-containing compound undergoing the color reaction of the various aryl amines are set forth in the aforesaid Wainer patents (and halogen-containing organic compounds meeting such definitions are used herein). Among the halogen-containing compounds specifically mentioned by Wainer is hexachloroethane, which has been found to give superior performance in the practice of the instant invention. Also, carbon tetrabromide, pentabromoethane and iodoform may be used. A substantial number of other halogen-containing compounds are mentioned in the Wainer and Sprague disclosures and these compounds are photo-responsive and may be used in the practice of the invention. It will be appreciated that the various combinations of (a) and (b) are responsive to actinic light within available wavelengths of approximately 200 to 7800 A., although photoresponse to the higher wavelengths is ordinarily obtainable by the use of conventional silver halide sensitizer dyes, and photoresponse to the far (or short) ultraviolet below about 3,000 is ordinarily available using quartz rather than glass systems. The preferred actinic light for purposes of developing the image in the practice of the instant invention is the near ultraviolet, i.e., generally considered to be 3,000 to 4,000 A., with the best results being obtained using actinic light within the range of about 3500–3800 A.

In general, the weight ratios of the starting agents (a) and (b) may vary widely, from a minimum practical weight ratio of (a):(b) of about 1:5 to a maximum ratio of about 50:1. If the proportion of halogen compound used is greater than that specified in the foregoing range, it is ordinarily found that no practical advantage is obtained, and, in general, the weight ratio of (a):(b) used is not below about 1:2, except in special situations wherein losses of a halogen compound (e.g., carbon tetrabromide) are contemplated prior to the actual use. Also, if the amount of halogen compound used is less than the minimum just specified, the combination may be inadequately photosensitive. In the particular dispersed phase, fused combination (ab) that is used in the practice of the instant invention in a continuous phase (c), it has been found that advantages are obtained often in the use of weight ratios of 5:1 to about 20:1, and advantages may often be obtained in the practice of the instant invention when carbon tetrabromide is used in these general ratios, but in combination with another agent (b), such as hexachloroethane. Thus, in approximate weight ratios of ($b_1$) hexachloroethane to ($b_2$) carbon tetrabromide of perhaps 1 to 2 to 10 to 1, it is found that the overall weight ratio of (a):(b) is preferably about 10:1.

Considering next the relative weights of the solids in the dispersed phase (1), i.e., ordinarily the combination (ab), plus certain relatively small amounts of additional functioning components, compared to the solids (2) in the continuous phase (c), it is found that the solids weight ratio of (1):(2) is preferably about 1:2, but may range from a maximum practical ratio of about 5:1 to a minimum practical ratio of about 1:50. The continuous phase (c) may be 100% "solids" in the sense that the entire system solidifies without any loss of solvent, e.g., in the formation of aqueous gel type systems, but generally the solids-to-liquid ratio in the continuous phase (c) is within the range of about 1:1 to about 1:30.

Preferably also the dispersed phase particles are in the range of about 0.1 to about 20 microns, but the preferred range is about 0.3 to 10 microns, with an average particle size preferably of about 3 to 4 microns.

It will be understood that modifications and variations may be effected without departing from the spirit and scope of the novel concepts of the present invention.

We claim:
1. In a process in which a photographic image is formed by image-wise exposure to actinic light of a photosensitive combination of (a) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film forming hydrophilic binder in which the organic halogen compound and nitrogen atom-containing compound are substantially insoluble, the improvement whereby areas of said image not light-struck by said exposure are desensitized, which comprises subjecting said areas to ammonia.

2. A process of claim 1 wherein the photographic image is obtained by sequential image-wise exposure to actinic light and heating.

3. The process of claim 1 wherein said binder is disposed on a translucent carrier.

4. The process of claim 1 wherein said areas are subjected to ammonia at a temperature within the range of 20 to 200° C., for a time sufficient to desensitize said non-light-struck areas.

5. The process of claim 1 wherein said binder is selected from the group consisting of gelatin, casein, polyvinyl alcohol, gum arabic, starch, alkali metal carboxymethylcellulose and hydroxyethylcellulose.

6. The process of claim 1 wherein said organic halogen compound is selected from the group consisting of carbon tetrabromide, tribromochloromethane, dibromodichloromethane, tribromoacetic acid, pentabromoethane, hexachloroethane, and hexabromoethane.

7. The process of claim 1 wherein said nitrogen atom-containing compound is an N-vinyl compound.

8. The process of claim 1 wherein said nitrogen atom-containing compound is selected from the group consisting of N-vinylcarbazole, N-ethylcarbazole, indol and diphenylamine.

9. The process of claim 7 wherein said continuous phase is selected from the group consisting of gelatin, casein, polyvinyl alcohol, gum arabic, starch alkali metal carboxymethylcellulose and hydroxyethylcellulose.

10. The process of claim 9 wherein said organic halogen compound is selected from the group consisting of carbon tetrabromide, tribromochloromethane, dibromodichloromethane, tribromoacetic acid, pentabromoethane, hexachloroethane and hexabromoethane.

11. The process of claim 10 wherein said N-vinyl compound is N-vinylcarbazole.

References Cited

UNITED STATES PATENTS

| | | | |
|---|---|---|---|
| 3,042,517 | 7/1962 | Wainer | 96—90 |
| 3,042,519 | 7/1962 | Wainer | 96—90 |
| 3,046,209 | 7/1962 | Spague | 204—158 |
| 3,090,697 | 5/1963 | Lawton et al. | 117—36.7 |
| 3,140,947 | 7/1964 | Foris | 96—48 |
| 3,140,948 | 7/1964 | Stewart et al. | 96—90 |

NORMAN G. TORCHIN, Primary Examiner

RICHARD E. FICHTER, Assistant Examiner